United States Patent
Sorensen et al.

[11] Patent Number: 5,690,883
[45] Date of Patent: Nov. 25, 1997

[54] REMOVAL OF INJECTION-MOLDED TIE FROM MOLD BY UTILIZING BULGES AT OPPOSITE ENDS OF ABUTMENT WALL OF TIE

[75] Inventors: Soren Christian Sorensen; Jens Ole Sorensen, both of Cayman Islands, Cayman Islands

[73] Assignee: GB Electrical, Inc., Milwaukee, Wis.

[21] Appl. No.: 583,800

[22] Filed: Jan. 5, 1996

[51] Int. Cl.$^6$ .................................................. B29C 45/44
[52] U.S. Cl. ................ 264/318; 264/328.1; 264/334; 425/556; 425/DIG. 58
[58] Field of Search ........................ 264/318, 328.1, 264/336, 334; 425/DIG. 58, 556

[56] References Cited

U.S. PATENT DOCUMENTS

| | | | |
|---|---|---|---|
| 3,193,884 | 7/1965 | Haynie | 425/DIG. 58 |
| 3,523,991 | 8/1970 | Tucker | 264/318 |
| 3,924,299 | 12/1975 | McCormick | 24/16 PB |
| 4,209,485 | 6/1980 | Greenspan | 264/318 |
| 4,473,524 | 9/1984 | Paradis | 264/291 |
| 4,777,004 | 10/1988 | Galer | 264/318 |
| 5,114,659 | 5/1992 | Krall | 264/318 |
| 5,146,654 | 9/1992 | Caveney et al. | 24/16 PB |
| 5,389,330 | 2/1995 | Sorensen et al. | 264/328.1 |
| 5,549,865 | 8/1996 | Guests | 264/318 |

FOREIGN PATENT DOCUMENTS 0590339  7/1947  United Kingdom .

*Primary Examiner*—Jill L. Heitbrink
*Attorney, Agent, or Firm*—Edward W. Callan

[57] ABSTRACT

In a method of injection molding a tie that includes an abutment wall surface having at least one tooth inside a locking head facing a pawl is formed in a mold that defines a tie in which the abutment wall includes at least one bulge adjacent each of opposite ends of the abutment wall for holding the abutment wall in the respective mold parts when the mold parts are first separated, with the at least one bulge adjacent one end of the abutment wall being defined by a first mold part and the at least one bulge adjacent the opposite end of the abutment wall being defined by a second mold part. As the first and second mold parts are being separated, the bulges initially hold the abutment wall in the respective first and second mold parts and thereby stretch and reduce the thickness of the abutment wall so that the tie can be removed from the mold without significantly damaging the at least one abutment surface tooth.

8 Claims, 1 Drawing Sheet

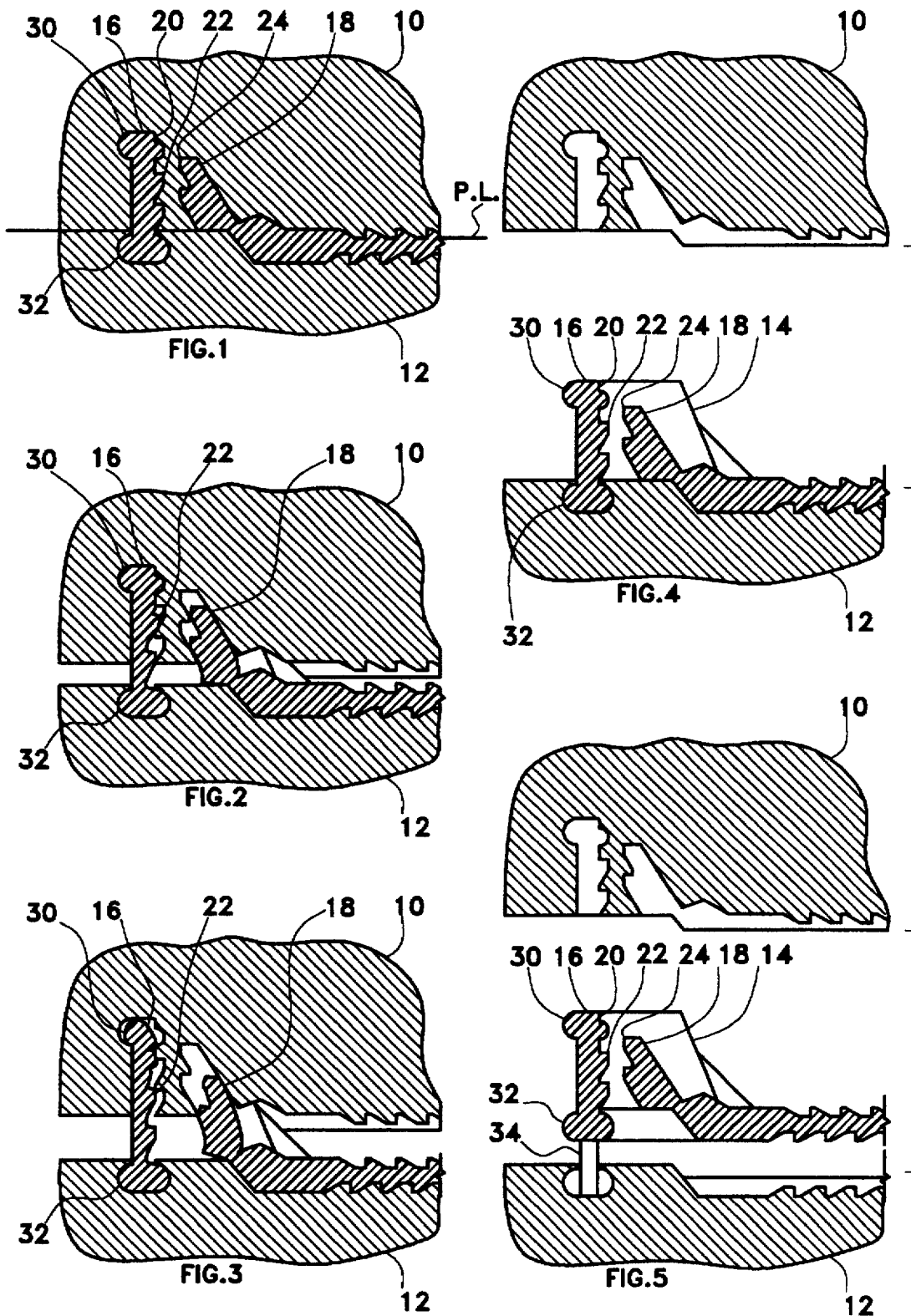

REMOVAL OF INJECTION-MOLDED TIE FROM MOLD BY UTILIZING BULGES AT OPPOSITE ENDS OF ABUTMENT WALL OF TIE

BACKGROUND OF THE INVENTION

The present invention generally pertains to injection molding of a tie that is useful for forming a loop for retaining a bundle of elongated articles, such as cables. Such a tie is commonly known as a cable tie. The present invention is particularly directed to removal from the mold of a tie having at least one tooth on an abutment surface in the locking head of the tie.

One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

A prior art method of injection molding such a tie includes the steps of:

(a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold.

When such a tie is formed by injection molding, it is difficult to remove the tie from the mold without significantly damaging the at least one tooth on the abutment surface unless the apex of the tooth is defined at a parting line between mold parts because the portion of the mold part that defines the abutment surface has a lateral dimension that is broader than the space between such tooth and the pawl, whereby withdrawal of such mold part from a parting line between mold parts compresses and thereby distorts such tooth.

SUMMARY OF THE INVENTION

The present invention provides a method of injection molding a tie, wherein the tie is removed from the mold without significantly damaging the at least one tooth on the abutment surface.

The present invention provides a method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said mold which defines a tie in which the abutment wall includes at least one bulge adjacent each of opposite ends of the abutment wall for holding the abutment wall in the respective mold parts when the mold parts are first separated, with the at least one bulge adjacent one end of the abutment wall being defined by a first mold part and the at least one bulge adjacent the opposite end of the abutment wall being defined by a second mold part; and wherein during step (d), as the first and second mold parts are being separated, the bulges initially hold the abutment wall in the respective first and second mold parts and thereby stretch and reduce the thickness of the abutment wall so that the tie can be removed from the mold pursuant to step (e) without significantly damaging the at least one abutment surface tooth.

Additional features of the present invention are described with reference to the detailed description of the preferred embodiments.

BRIEF DESCRIPTION OF THE DRAWING

FIG. 1 is a sectional view illustrating formation of the abutment wall portion of a tie in a mold utilized in a preferred embodiment of the injection molding method of the present invention.

FIG. 2 is a sectional view illustrating stretching of the abutment wall during initial separation of the mold parts shown in FIG. 1.

FIG. 3 is a sectional view illustrating partial release of one end of the abutment wall during further separation of the mold parts shown in FIGS. 1 and 2.

FIG. 4 is a sectional view illustrating removal of the tie from the first mold part subsequent to the separation stages shown in FIGS. 2 and 3.

FIG. 5 is a sectional view illustrating ejection of the tie from the second mold part subsequent to removal of the tie from the first mold, as shown in FIG. 4.

DETAILED DESCRIPTION

Referring to FIG. 1, in a preferred embodiment of the method of the present invention, a tie of the type described above is injection molded in a mold including a first mold part 10 and a second mold part 12. When the mold is closed, as shown in FIG. 1, the first mold part 10 and the second mold part 12 join at a parting line P.L. and define a cavity therebetween in the general shape of the tie 14 (FIG. 4), which includes an abutment wall 16 and a pawl 18. An abutment surface 20 of the abutment wall 16 includes at least one tooth 22 facing the pawl 18; and the pawl 18 includes at least one tooth 24 facing the abutment wall 16.

The abutment wall 16 further includes at least one bulge 30, 32 adjacent each of opposite ends of the abutment wall 16 for holding the abutment wall 16 in the respective mold parts 10, 12 when the mold parts 10, 12 are first separated. The at least one bulge 30 adjacent one end of the abutment wall 16 is defined by the first mold part 10; and the at least one bulge 32 adjacent the opposite end of the abutment wall 16 is defined by the second mold part 12. The first mold part 10 also defines the pawl 18. Preferably, the bulges 30, 32 extend laterally relative to the mold separation direction. The at least one bulge 32 adjacent the opposite end of the abutment wall 16 has a greater lateral extension than the at least one bulge 30 adjacent one end of the abutment wall 16 so that when the first mold part 10 is further separated from the second mold part 12, the at least one bulge 30 adjacent one end of the abutment wall 16 releases from the first mold part 10 while the at least one bulge 32 adjacent the opposite end of the abutment wall 16 continues to be held by the second mold part 12.

Molten plastic material is injected into the mold cavity; and the injected plastic material is solidified in the mold cavity to form the tie 14. The first mold part 10 is separated from the second mold part 12 in a direction normal to at least a portion of the parting line P.L. During the initial stage of separation of the first mold part 10 from the second mold part 12, the bulges 30, 32 hold the abutment wall 16 in the respective first and second mold parts 10, 12, as shown in FIG. 2, to thereby cause the abutment wall 16 to be stretched so that the thickness of the abutment wall 16 is so reduced that the tie 14 can be removed from the mold without significantly damaging the at least one abutment surface tooth 22.

Further separation of the first mold part 10 from the second mold parts 12 subsequent to the initial stretching of the abutment wall 16 causes the at least one bulge 30 at the one end of the abutment wall 16 to be released from the first mold part 10, as shown in FIG. 3. As the tie 14 is fully removed from the first mold part 10 by still further separation of the first mold part 10 from the second mold part 12, as shown in FIG. 4, the stretched abutment wall 16 having the reduced thickness is removed from the first mold part 10 without significantly damaging the at least one tooth 22 on the abutment surface 20. Referring to FIG. 5, the tie 14 is then ejected from the second mold part 12 by protraction of a pair of ejector pins 34.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said mold which defines a tie in which the abutment wall includes at least one bulge adjacent each of opposite ends of the abutment wall for holding the abutment wall in the respective mold parts when the mold parts are first separated, with the at least one bulge adjacent one end of the abutment wall being defined by a first mold part and the at least one bulge adjacent the opposite end of the abutment wall being defined by a second mold part; and wherein during step (d), as the first and second mold parts are being separated, the bulges initially hold the abutment wall in the respective first and second mold parts and thereby stretch and reduce the thickness of the abutment wall so that the tie can be removed from the mold pursuant to step (e) without significantly damaging the at least one abutment surface tooth.

2. A method according to claim 1, wherein during step (d) further separation of the first and second mold parts subsequent to initial stretching of the abutment wall causes the at least one bulge at the one end of the abutment wall to be released from the first mold part, which defines the at least one tooth on the abutment surface.

3. A method according to claim 2, wherein step (a) comprises providing mold parts that define bulges that extend laterally relative to the mold separation direction.

4. A method according to claim 3, wherein the first and second mold parts are joined at a parting line and step (d) comprises separating the first and second mold parts in a direction normal to at least a portion of the parting line.

5. A method according to claim 2, wherein the first and second mold parts are joined at a parting line and step (d) comprises separating the first and second mold parts in a direction normal to at least a portion of the parting line.

6. A method according to claim 1, wherein step (a) comprises providing mold parts that define bulges that extend laterally relative to the mold separation direction.

7. A method according to claim 6, wherein the first and second mold parts are joined at a parting line and step (d) comprises separating the first and second mold parts in a direction normal to at least a portion of the parting line.

8. A method according to claim 1, wherein the first and second mold parts are joined at a parting line and step (d) comprises separating the first and second mold parts in a direction normal to at least a portion of the parting line.

* * * * *